Figures 1, 2:
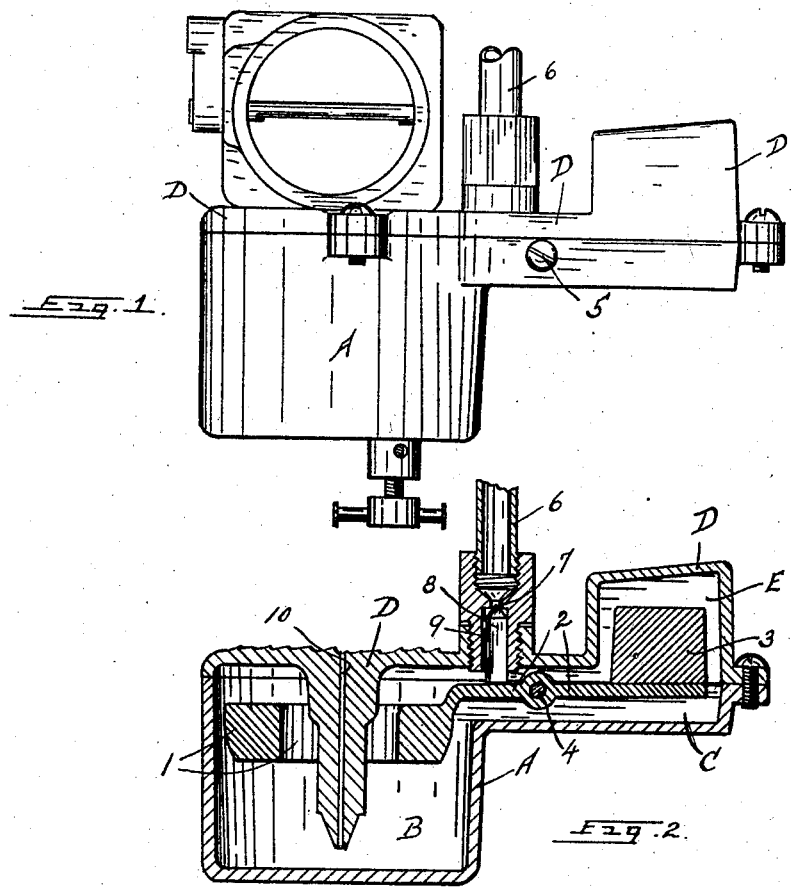

Feb. 1, 1927.

A. DICKERSON

VALVE REGULATING DEVICE

Filed Sept. 2, 1925

1,616,078

Inventor

Arthur Dickerson

By J. M. Thomas

Attorney

Patented Feb. 1, 1927.

1,616,078

UNITED STATES PATENT OFFICE.

ARTHUR DICKERSON, OF SALT LAKE CITY, UTAH.

VALVE-REGULATING DEVICE.

Application filed September 2, 1925. Serial No. 54,018.

My invention relates to valve regulators, and has for its object to provide a new and efficient means for regulating the valve in the fuel supply pipe or conduit for internal combustion engines. A further object is to provide a balanced float, herein called a displacement member, for regulating the supply of liquid fuel in the carburetor of an internal combustion engine in order that there will be the required amount of liquid fuel conveniently supplied to drive the engine with a heavy load, or at great speed, and when idling the engine.

These objects I accomplish with the device illustrated in the accompanying drawings, in which similar letters and numerals of reference indicate like parts throughout the several views and as described in the specification forming a part of this application and pointed out in the appended claims.

In the drawings in which I have shown the best and most substantial embodiment of my invention, Figure 1 is a side elevation of the device and parts of a carburetor to which it is attached. Figure 2 is a vertical longitudinal section of the device.

In most carburetors now on the market and in use, a float is used to regulate the supply of fuel to the carburetor by operating a needle valve, and if the float is made of cork it soon becomes saturated with the liquid fuel and frequent adjustments are necessary. In some carburetors the needle valve is carried in the float, and the seat for said valve in other parts of the carburetor, while in other types of carburetors, the two parts are reversed, but in either use the vertical movement of the float and seat must be in alinement to secure the desired regulation and action in the flow of the fuel.

In the present invention these difficulties are overcome by using a liquid fuel chamber, which for convenience is called the float chamber, and an adjacent weight chamber adapted to drain into said float chamber, with a displacement member and a weight member, in order that the vertical movement of the displacement member will always be in the same vertical plane, and which displacement member will not become saturated with the liquid fuel.

In the drawings filed herewith, the casing A has a float chamber B therein, and a recess C, which is on a higher plane than said float chamber and connected therewith. A cover plate D has a weight chamber E formed in its under side which opens into said recess C. An annular displacement member 1 is concentrically mounted in said float chamber B, and is provided with an integral radial arm 2 having a weight 3 on its free end portion. A transverse pin or shaft 4 is secured in said arm 2, and the ends of said pin are recessed to engage with pointed tap screws 5, which tap screws are inserted through the side walls of said recess C to hold said weight 3 and displacement member 1 in place in their respective chambers, and to allow limited movement up or down of the weight and displacement member.

Liquid fuel, such as gasoline enters the float chamber B through the pipe 6 and around the valve seat 7, and the flow of the liquid fuel is controlled by the needle valve 8 which is carried on the upper face of said arm 2. A valve chamber 9 keeps the said needle valve 8 in vertical position to engage in its valve seat 7.

The operation of my device is as follows:—With liquid fuel, such as gasoline, supplied through the pipe 6, some of it will flow into the float chamber B and fill said chamber until the liquid partially submerges the displacement member 1, and some of said fuel will flow through the port 10 into the mixing chamber of the carburetor. The said displacement member 1 and weight 3 are so nearly of the same weight that normally the weight 3 is the lighter of the two, but when the liquid fuel partially surrounds the displacement member 1 it will raise and seat the needle valve 8 in its seat 7 and stop the flow of fuel. When the engine is operated some of the fuel in the chamber B will be drawn as a flow through said port 10 into the carburetor and the displacement member 1 will be lowered enough to again open the pipe 6 by unseating the needle valve 8. Should any lateral movement of the vehicle occur that would splash the liquid fuel out of the float chamber into the weight recess, it will drain back into the chamber B. Should any vaporization of the fuel occur in the chambers B and C, the expansive force thereof would bear equally on the upper surface of said weight and displacement member, and not affect the operation of either or the balancing thereof.

Having thus described my invention I desire to secure by Letters Patent and claim:—

1. A casing having a float chamber and a recess therein; a fuel inlet to said float chamber; a valve to open and close said inlet; a displacement member in said float chamber and a weight member connected by an arm which is pivotally mounted in said casing; which arm is adapted to move said valve; and a cover for said casing through which said inlet opening is provided, and having a weight chamber in its lower side opening into said recess.

2. A valve regulating device comprising a casing having an inlet; a float chamber in one end thereof and a weight chamber in the other end; a displacement member mounted in said float chamber; a weight mounted in said weight chamber; an arm connecting said displacement member and said weight; a cut off valve carried on the upper face of said arm adapted to close said inlet; and a transverse pin secured in said arm to suspend said displacement member and said weight in their respective chambers.

3. A valve regulating device comprising a float chamber, a weight chamber and a fuel inlet for said float chamber, a displacement member and a weight connected by a horizontally disposed arm pivoted between said chambers and adapted to support said displacement member and weight in approximately balanced position relative to each other, a valve operable by said arm for controlling the flow of fuel through said inlet, said displacement member adapted to be raised by fuel entering said float chamber.

In testimony whereof I have affixed my signature.

ARTHUR DICKERSON.